US010764244B1

(12) United States Patent
Mestery et al.

(10) Patent No.: US 10,764,244 B1
(45) Date of Patent: Sep. 1, 2020

(54) SYSTEMS AND METHODS PROVIDING A MULTI-CLOUD MICROSERVICES GATEWAY USING A SIDECAR PROXY

(71) Applicant: Cisco Technology, Inc., San Jose, CA (US)

(72) Inventors: Kyle Andrew Donald Mestery, Woodbury, MN (US); Jerome Tollet, Paris (FR); Ian Wells, San Jose, CA (US); Aloÿs Christophe Augustin, Versailles (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/439,441

(22) Filed: Jun. 12, 2019

(51) Int. Cl.
*H04L 29/12* (2006.01)
*G06F 9/455* (2018.01)
*H04L 12/24* (2006.01)

(52) U.S. Cl.
CPC ...... *H04L 61/2567* (2013.01); *G06F 9/45541* (2013.01); *G06F 9/45558* (2013.01); *H04L 41/046* (2013.01); *H04L 61/251* (2013.01); *H04L 61/2592* (2013.01)

(58) Field of Classification Search
CPC . H04L 63/0815; H04L 63/0807; H04L 67/02; H04L 67/10; H04L 63/083; H04L 63/102; H04L 63/20; H04L 63/0884; H04L 63/10; H04L 63/06; H04L 67/20; H04L 63/0281; G06F 21/6218; G06F 9/45558; G06F 21/41; G06F 21/53; H04W 12/06
See application file for complete search history.

(56) References Cited

U.S. PATENT DOCUMENTS

| | | | | |
|---|---|---|---|---|
| 10,255,413 | B2* | 4/2019 | Gaur | G06F 21/00 |
| 10,338,913 | B2* | 7/2019 | Franchitti | G06F 16/9538 |
| 10,511,651 | B2* | 12/2019 | Sahu | H04L 61/106 |
| 2017/0230349 | A1* | 8/2017 | Gaur | G06F 21/57 |
| 2017/0331812 | A1* | 11/2017 | Lander | H04L 63/083 |
| 2018/0048638 | A1* | 2/2018 | Lewis | H04L 9/3268 |
| 2018/0295118 | A1* | 10/2018 | Otero | G06F 9/4451 |
| 2019/0034617 | A1* | 1/2019 | Scarlata | G06F 9/3016 |
| 2019/0080062 | A1* | 3/2019 | Easley | H04L 63/08 |
| 2019/0141119 | A1* | 5/2019 | Bernat | H04L 41/5006 |
| 2019/0141536 | A1* | 5/2019 | Bachmutsky | H04W 28/02 |
| 2019/0171438 | A1* | 6/2019 | Franchitti | G06N 20/00 |
| 2019/0180002 | A1* | 6/2019 | Gaur | G06F 21/629 |

(Continued)

*Primary Examiner* — Ninos Donabed
(74) *Attorney, Agent, or Firm* — Polsinelli PC

(57) ABSTRACT

A method includes, in a constellation of clients including a first client and a second client, receiving, at the first client, a connection request from the second client, retrieving endpoint reachability data associated with the second client and transmitting, to a server, a connection request based on the endpoint reachability data. The first client receives, from the server and based on the connection request, endpoint reachability information associated with the second client and starts a bidirectional connection with the second client. A direct or indirect tunnel is established between the first client and the second client. The tunnel is set up based on a table which maps a first connectivity option associated with the first client to a second connectivity option associated with the second client to determine whether to establish the direct tunnel or the indirect tunnel between the first client and the second client.

21 Claims, 11 Drawing Sheets

(56) References Cited

U.S. PATENT DOCUMENTS

| | | | |
|---|---|---|---|
| 2019/0235979 A1* | 8/2019 | Li | G06F 9/4856 |
| 2019/0273746 A1* | 9/2019 | Coffing | H04L 63/105 |
| 2020/0050494 A1* | 2/2020 | Bartfai-Walcott | H04L 67/10 |

* cited by examiner

|  | Global IPv6 No firewall | Global IPv6 Ingress blocked | Global IPv4, no firewall | Global IPv4, Ingress blocked | Private IPv4, pierceable NAT (UPNP, STUN) | Private IPv4, unpierceable NAT |
|---|---|---|---|---|---|---|
| Global IPv6 No firewall | Trivial |  | Relay Ip4 to Ip6 (e.g. Teredo) | Relay Ip4 to Ip6 (e.g. Teredo) | Relay Ip4 to Ip6 (e.g. Teredo) | Relay Ip4 to Ip6 (e.g. Teredo) |
| Global IPv6 Ingress blocked | * |  | Relay Ip6 to Ip4 (e.g. Map-T) | Relay Ip4<-->Ip6 (e.g. Teredo or Map-T) | Relay Ip6 to Ip4 (e.g. UPNP+Map-T) | Relay Ip4 to Ip6 (e.g. Teredo) |
| Global IPv4, no firewall |  |  | Trivial | Trivial | Trivial | Trivial |
| Global IPv4, Ingress blocked |  |  |  | * | * ** | * |
| Private IPv4, pierceable NAT (UPNP, STUN) |  |  |  |  | ** | ** |
| Private IPv4, unpierceable NAT |  |  |  |  |  | Relay (e.g. TURN Relay) |

FIG. 5C

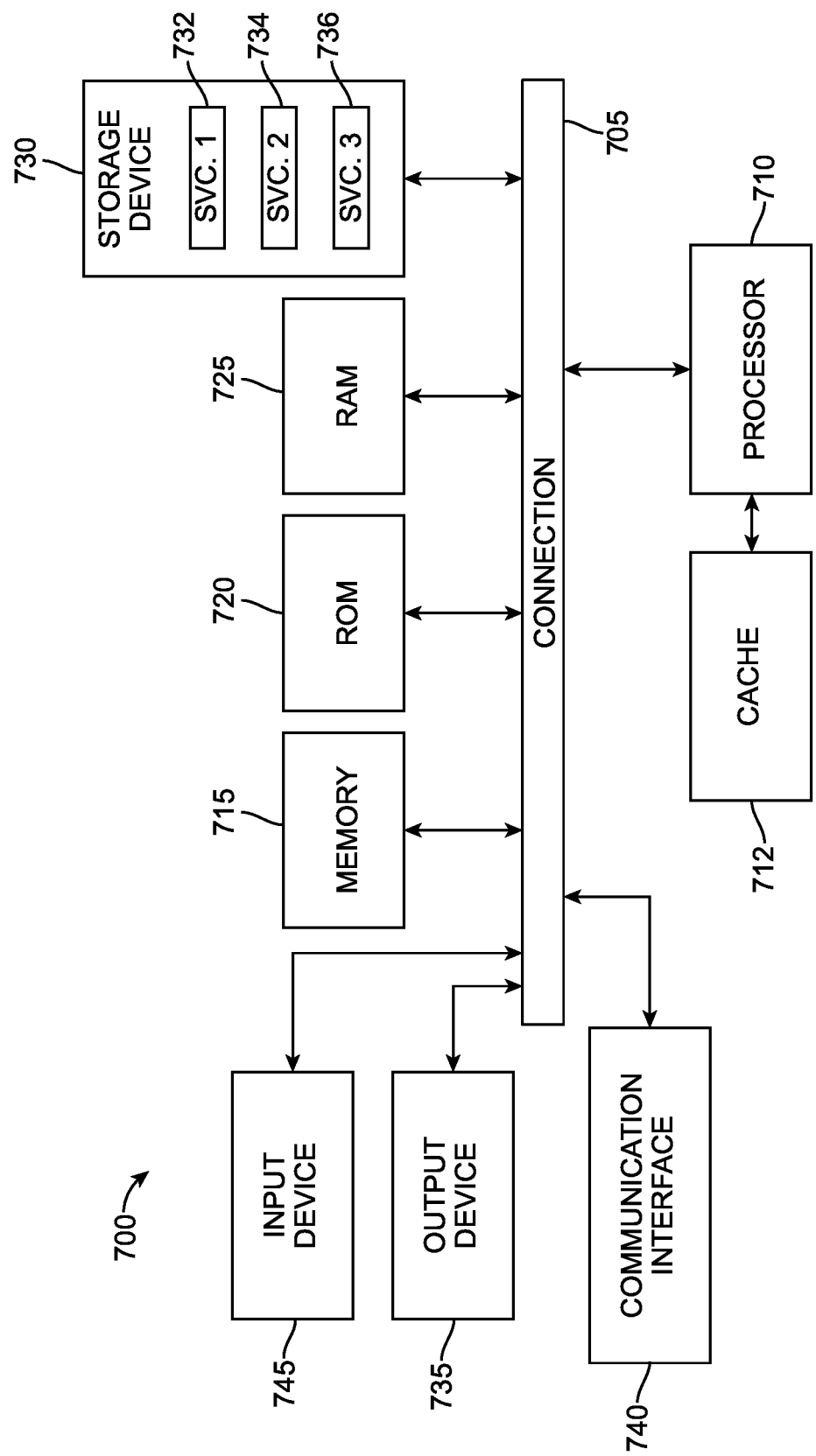

US 10,764,244 B1

SYSTEMS AND METHODS PROVIDING A MULTI-CLOUD MICROSERVICES GATEWAY USING A SIDECAR PROXY

TECHNICAL FIELD

The subject matter of this disclosure relates in general to the field of cloud computing and more specifically to providing an end-to-end secured connectivity and global reachability between various microservices running as service functions, inside containers, inside virtual machines or even on bare metal.

BACKGROUND

The emergence of production grade container orchestration platforms is making microservice-based applications increasingly popular. Microservice-based applications can help reduce development time while increasing application scaleability. When deployed in the cloud, microservices-based applications can leverage a cloud provider's specific APIs making development time even faster. However, while these platforms are helping developers and operation teams, they can become a constraint when it comes to multi-cloud or when applications are using heterogeneous technologies. Connecting workloads can be complex when running in a data center like AWS (Amazon Web Services), Azure (Microsoft's Web Services) or GCP (Google Cloud Provider). Moreover, workloads can have multiple form factors including bare metal, virtual machines, containers or serverless.

A practical example of such a limitation would be an application made of the following microservices: a container running in Kubernetes with AWS leveraging AWS DynamoDB PI; a virtual machine running in Azure using the Azure machine learning service; and a physical server with a fast GPU (Graphics Processing Unit) running in a private data center. Connecting workloads in these different examples can be complex.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5C illustrates a table which can represent a database showing the mapping of various connectivity parameters for a first endpoint on one excess and a second endpoint on another access to determine a tunnel configuration between the two endpoints;

FIG. 7 illustrates an example computing device architecture, in accordance with some examples.

DETAILED DESCRIPTION

Figure 1:
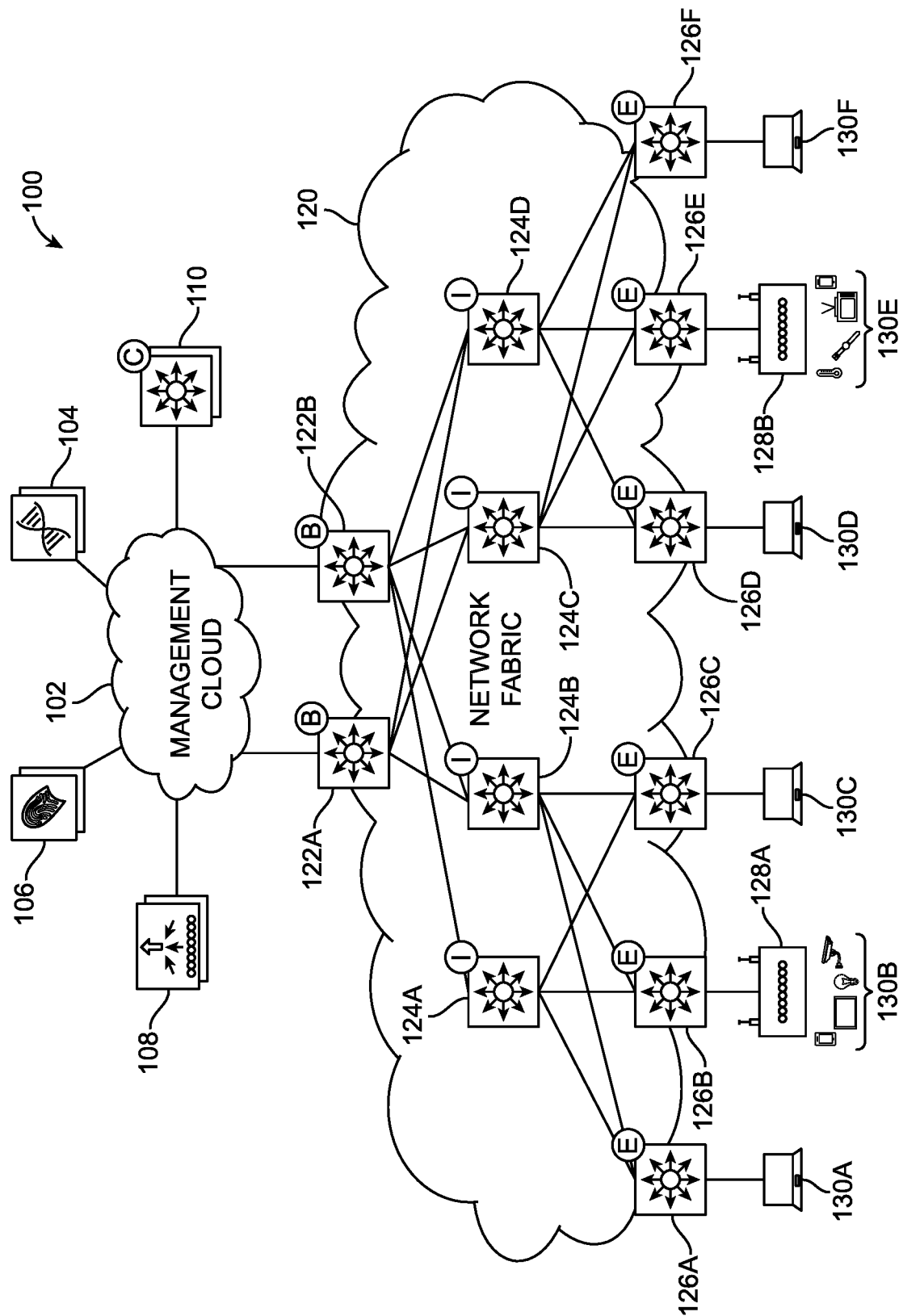
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It is possible to leverage virtual private network (VPN) gateways provided by cloud service providers, but the task of connecting microservice workloads in a heterogeneous environment cannot be easily done by a regular developer. It often requires infrastructure teams to be involved. Once a secured connectivity is in place, the developer will have difficulty locating services running on multiple clouds without the support of a multi-cloud enabled service discovery platform. Microservices may have different kinds of connectivity: public IPv4, private IPv4 with NAT, globally reachable IPv6, etc. As a consequence, developers have to make compromises and limit the use of the best of breed APIs offered by CSPs.

In order to address the issue raised by microservice workloads in a heterogeneous environment being difficult to connect, this disclosure focuses on a solution in which an agent or a sidecar proxy is deployed with, within or close to microservice workloads. A server is established that is reachable by all the agents. Agents can have different form factors depending on the microservice deployment type such as whether it is a container, virtual machine, or bare metal. Through the operations of the agents, communications between microservices via direct or indirect tunnels can be established to enable data to flow between respective microservices.

Disclosed herein are systems, methods, and computer-readable media. An example method includes deploying a first agent in connection with a first microservice in a first cloud computing environment, the first microservice being of a first type, gathering, by the first agent, reachability candidate information including endpoint-related information of other microservices different from the first agent and required by the first microservice, to yield first reachability candidate information, receiving, based on the first reachability candidate information, a registration of the first microservice at a server and authenticating the first microservice by the server. Next, the method includes deploying a second agent in connection with a second microservice in a second cloud computing environment, the second microservice being of a second type. The first cloud computing environment can differ from the second cloud computing environment.

The method further includes gathering, by the second agent, reachability candidate information including endpoint-related information of other microservices different from the second agent and required by the second microservice, to yield second reachability candidate information, receiving, based on the second reachability candidate information, a registration of the second microservice at the server and authenticating the second microservice by the server. The method can include transmitting a first verifiable identity document from the first agent to the server, receiving, from the server, a first valid certificate at the first agent based on the first verifiable identity document to yield a first authentication, transmitting a second verifiable identity document from the second agent to the server, receiving, from the server, a second valid certificate at the second agent based on the second verifiable identity document to yield a second authentication, receiving, based on the first authentication and at the first agent, a first constellation IP address for the first microservice, and receiving, based on the second authentication and at the second agent, a second constellation IP address for the second microservice. The server enables microservice discovery and distributes constellation IP addresses to authorized agents such that end-to-end secured connectivity and global reachability is available between the first microservice of the first type and the second microservice of the second type.

In another aspect, a method can be performed at a client configured in a constellation of clients having a first client and a second client. The first client includes a first microservice of a first type and an associated first agent and the second client includes a second microservice of a second type and an associated second agent. The method includes receiving at the first client a connection request from the second client, retrieving endpoint reachability data associated with the second client, transmitting, to a server, a connection request based on the endpoint reachability data, receiving, from the server and based on the connection request, endpoint reachability information associated with the second client, starting, at the first client and with the second client, a bidirectional connection, and establishing, based on the bidirectional connection, a tunnel between the first client and the second client. The tunnel can be configured as one of a direct tunnel or an indirect tunnel between the first client and the second client.

The establishing of the tunnel can be based on a table which maps a first connectivity option associated with the first client to a second connectivity option associated with the second client to determine whether to establish the direct tunnel or the indirect tunnel between the first client and the second client. The method can include communicating, via the tunnel, application data between the first client and the second client.

Description of Example Embodiments

Disclosed herein are systems, methods, and computer-readable media for schemes according to which, real time and original traffic streams transmitted between source and destination nodes may be selectively chosen, headers thereof truncated, and transmitted to a network controller for network analysis, without interfering with the real time and original traffic streams being forwarded to their destinations. Some example advantages of using the real time and original traffic streams are the reduction of load in both control and data planes as well as significant reduction in complexity of performing network monitoring, performance measurement and detecting network impairments.

Cloud-native environments can include cloud computing systems which employ containers. Containers are a lightweight, efficient and standard way for applications to move between different environments (e.g., an on-premises site, a remote site, etc.) and run independently. In some implementations, a container may hold all the information and data which may be needed for running an application. For example, code, run time, system tools, libraries and settings for an application may be packaged in the container. The use of containers makes it possible to build distributed applications for cloud-native environments.

Different software services may be supported by cloud-native applications. The term "microservice" refers to a software service which may be used for building a distributed application using containers. A microservice architecture treats different functions of a cloud-native application (e.g., security, traffic management, etc.) as independent services that can be altered, updated, or taken down without affecting other applications in the cloud-native environment. In some examples, microservices may be built around business capabilities of a company utilizing a cloud-native environment, and the microservices may be independently deployable using fully automated deployment machinery.

Based on their infrastructure, the cloud-native applications may utilize various software services for functions such as load balancing, traffic managing, routing, health monitoring, security policies, service and user authentication, protection against intrusion, distributed denial of service (DDoS) attacks, etc. In cloud-native applications, these software services may be implemented using microservices constructs, which may involve the provision of a large number (e.g., hundreds or thousands) of containers. Discrete hardware appliances for managing these large numbers of containers are not practical, and hence, a "service mesh" is employed to manage and deliver the microservices which may be integrated within a compute cluster of a cloud-native environment, for example. The service mesh utilizes application programming interfaces (APIs) which do not need hardware appliances for their implementation. In some examples, the service mesh may deliver a pervasive layer of services across all environments that containerized applications and microservices can be connected to.

Thus, the service mesh may be used to deliver services such as traffic management, security, and observability to container-based microservices applications directly within the compute cluster. Since the service mesh provides monitoring, scalability, and high availability services through software components controlled by APIs instead of using discrete hardware appliances, the flexible framework of the service mesh reduces the operational complexity associated with modern, distributed applications. For example, the service mesh delivers application services, such as load balancing without requiring an expensive and challenging alternative such as a physical hardware appliance load balancer at each location and/or each server utilized by the cloud infrastructure.

A service mesh may be implemented using an array of network proxies alongside the containers. Each proxy or agent, referred to as a "sidecar proxy", serves as a gateway to interactions that occur between containers. A sidecar proxy assists in spreading compute load across the service mesh and directing a request to the appropriate downstream container that can serve the request. A central controller may orchestrate the connections in the service mesh, and a control plane may be configured to monitor the service traffic flowing between sidecar proxies. The control plane may deliver access control policies and collects performance metrics to be provided to the orchestrator. The orchestrator may also integrate with platforms such as open-source systems for automating the deployment and management of containerized applications.

In a service mesh infrastructure, each microservice may be developed, deployed and managed independently, as noted above. For example, new features and updates to a microservice may be delivered to the service mesh, sometimes in a rapid and incremental fashion, such that newer versions of microservices may be continually integrated into the cloud-native platform. Micro service-based applications developed in this manner are extremely dynamic as they can be updated and deployed hundreds of times a day, for example. However, given the independent manner in which the numerous microservices, and versions thereof, may be developed and deployed, there may be vulnerabilities in one or more of these microservices. Some vulnerabilities may be severe and cause widespread disruption across the service mesh, while others may be less severe and contained. Identifying the vulnerabilities, recognizing potential containers which may be affected and taking action based on the criticalities of these vulnerabilities is a challenge. The following sections describe systems and methods for protecting an example service mesh from software vulnerabilities.

FIG. 1 illustrates an example of a topology of an enterprise network 100 which may be configured according to aspects of this disclosure. While the particular discussion of a constellation server and agents deployed in connection with clients is not necessary developed in the discussion of FIGS. 1-3, the network environments described can have some applicability to the framework introduced in FIG. 4.

The enterprise network 100 shown in FIG. 1 can include a wired network whose traffic may be monitored according to example techniques herein. In one example, the enterprise network 100 may provide intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity. The principles disclosed herein with respect to using the sidecar proxies can apply to any resource of the network 100.

The enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can include one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120. In one aspect, the management cloud 102 could perform the operations of the constellation server 410 introduced in FIG. 4.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some examples, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can include fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may include a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some examples, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth. Any endpoint can be configured with an agent or a sidecar proxy as discussed below in connection with FIG. 4.

In some examples, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
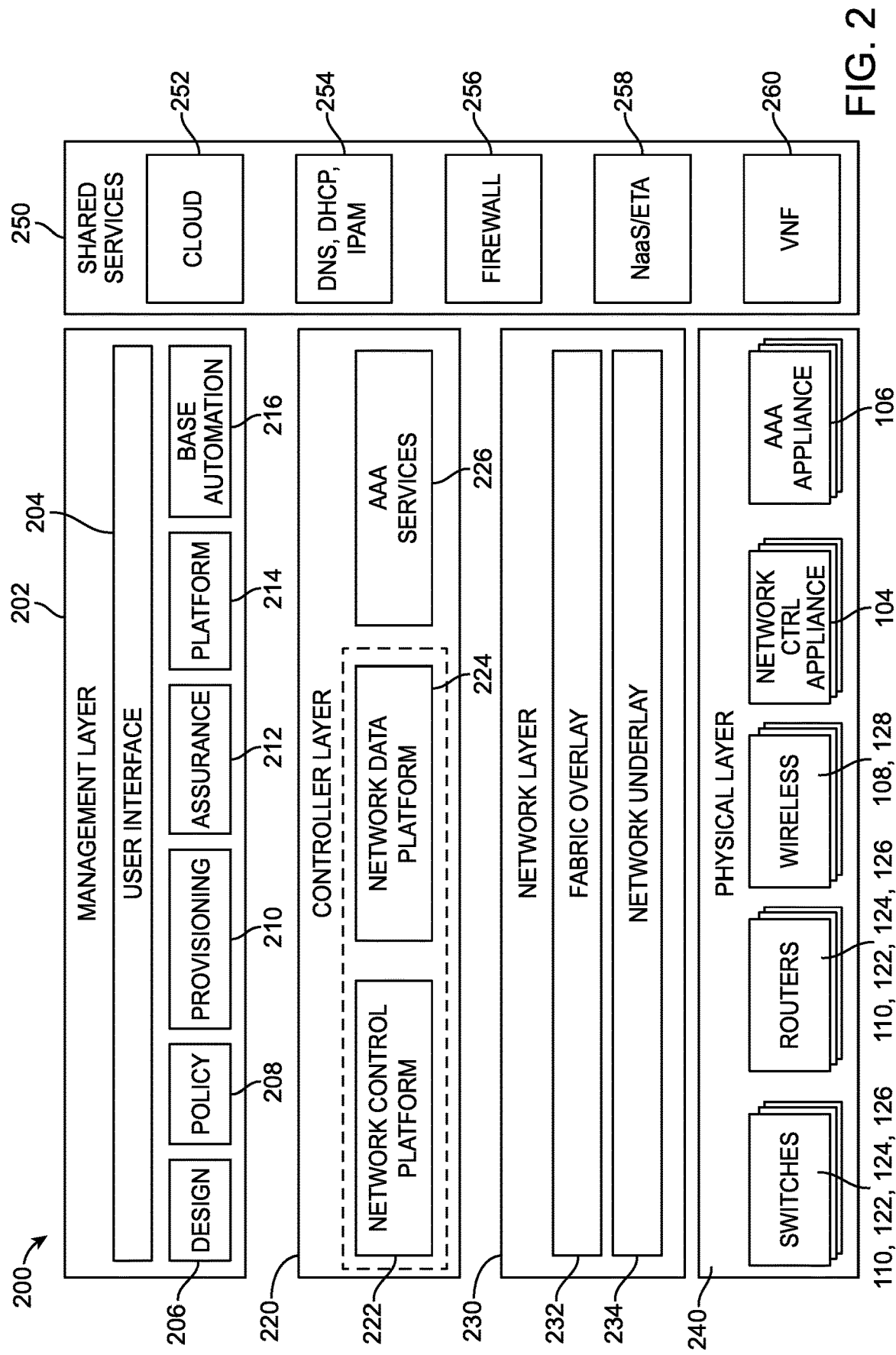
FIG. 2 illustrates a logical architecture for an enterprise network in accordance with some examples.

FIG. 2 illustrates an example of a logical architecture 200 for an enterprise network (e.g., the enterprise network 100) in which the principles disclosed herein can apply. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some examples, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

The operations of the constellation server 410 can be performed by one or more of the management layer 202, controller layer 220, network layer 230 and/or physical layer 240.

Figure 3:
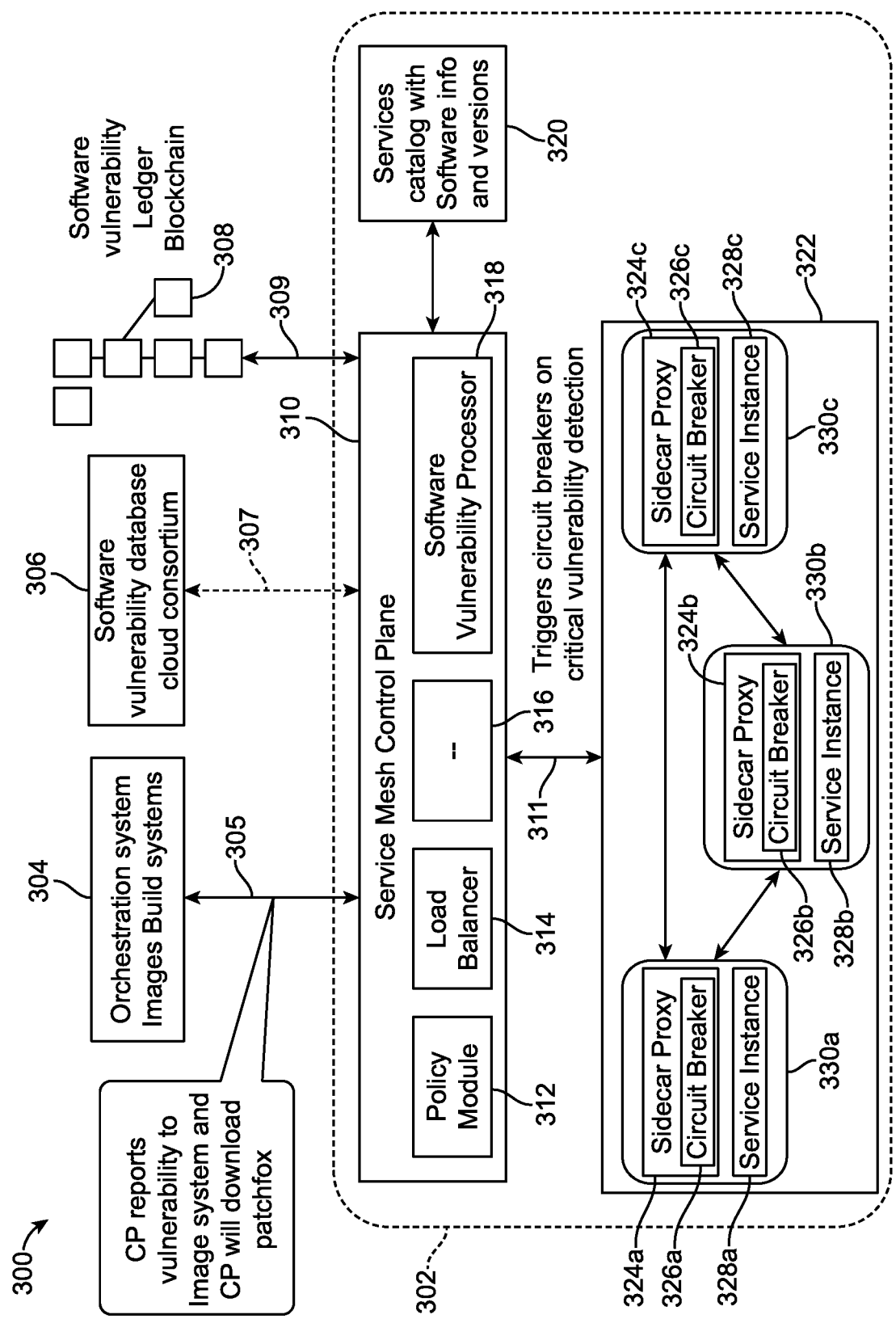
FIG. 3 illustrates a service mesh in coordination with external feeds for obtaining information about software vulnerabilities in accordance with some examples.

FIG. 3 illustrates an example topology of a network 300 configured to implement aspects of this disclosure. The network 300 may be an enterprise network for supporting cloud-native applications. In some aspects, the network 300 may be include an example implementation of the enterprise network 100 of FIG. 1 whose logical architecture 200 was described with reference to FIG. 2 above.

For example, the network 300 illustrates a service mesh 302 which may provisioned with a network fabric such as the network fabric 120 of FIG. 1. The service mesh 302 may be a software defined network (SDN) and include a centralized control plane 310 that configures the data plane of the service mesh 302. The service mesh 302 provides an infrastructure layer for governing service-to-service communications. The service mesh 302 includes an array 322 of network proxies. Among the various network proxies which the array 322 may include, sidecar proxies 324a-c are illustrated, and will be explained in more detail below. The sidecar proxies describe next can be applicable as the agents or sidecar proxies discussed in FIG. 4.

As will be understood by one skilled in the art, enterprise networks may use proxies for implementing security measures and managing accesses to services. For example, if a user in an office environment of a company requests a webpage from a computer in the office, then the request may first be received by a web proxy of the company which may check the request for security issues. Once the security measures implemented by the web proxy are cleared, then the request may be sent to an external server that hosts the web page. When the web page is returned back to the computer in response to the request, the web proxy may once again check the content in the web page being returned for security issues, and then the proxy returns the web page and its contents of the web page to the user. In the service mesh 302, requests are routed between microservices through proxies in their own infrastructure layer. For this reason, individual proxies that make up a service mesh are referred to as sidecars or sidecar proxies, since they run alongside each service, rather than within them. The sidecar proxies 324a-c are examples of such sidecar proxies which may be present in the service mesh 302.

A sidecar proxy may handle access and security measures for one or more service instances to which the sidecar proxy is paired. For example, service instances 328a-c are shown in FIG. 3, paired with respective sidecar proxies 324a-c. Further, a service instance and its paired sidecar may proxy share a container. For example, containers 330a-c are shown, wherein each container 330a-c may be shared by a respective service instance 328a-c and sidecar proxy 324a-c. The sidecar proxies 324a-c can handle communication with service instances of other containers. For example, the sidecar proxy 324a of the container 330a may handle communication of the service instance 328a with the service instance 328b of the container 330b. The sidecar proxies 324a-c can also support capabilities such as discovery of service instances, load balancing, authentication and authorization, secure communications, etc., in the service mesh 302. The service instances 328a-c may be microservices. As previously explained, the microservices may be a specialization of an implementation approach for service-oriented architectures (SOA) used to build flexible, independently deployable software systems.

The control plane 310 may handle the control functions for the service mesh 302, as previously mentioned. For example, the control plane 310 may install and maintain policy and configuration on the service instances 328a-c (e.g., through respective sidecar proxies 324a-c). The control plane 310 may instructs the sidecar proxies 324a-c with dynamic updates to these policies and configurations in some examples. Accordingly, the control plane 310 may include different modules for carrying out these functions. For example, the control plane 310 may include a policy module 312 for defining and managing network policies, traffic policies, etc. The control plane 310 may also include a load balancer 314 for implementing load balancing schemes for balancing the traffic and workloads in the service mesh 302. One or more other modules which may be present in the control plane 310 are generically shown as the module 316, for performing the one or more control functions discussed with reference to the control layer 220 in FIG. 2, for example.

In example aspects, the control plane 310 may include a software vulnerability processor (SVP) 318 for handling the various functions related to identifying, isolating, and rectifying software vulnerabilities, for example. In one or more examples, the SVP 318 (or more generally, the control plane 310) may be in communication with a services catalog 320. The services catalog 320 may maintain a catalog of various details, such as the software versions, origin, release date, etc., for the software running in the various service instances 328a-c of the service mesh 302, for example. Accordingly in some examples, the services catalog 320 may contain an up to date mapping of the software (and version thereof) and the service instances 328a-c. The services catalog 320 may be updated in one or more manners, which will be described below.

As shown in FIG. 3, the control plane 310 of the service mesh 302 may communicate with one or more external entities. Among these, an orchestration system 304 may work in coordination with the service mesh 302 for deployment, scaling, and management of containerized applications such as in the containers 330a-c of the service mesh 302. For example, open-source orchestration systems are known in the art for automatic management or containerized applications. The orchestration system 304 may, among other functions, maintain the state of workloads/applications, container images, network resources, etc.

The service mesh 302 may also be in communication with various other external feeds 307, 309, etc., for obtaining information on potential vulnerabilities in the software executing in its containers 330a-c, for example. The software vulnerabilities discussed herein may pertain to any exposures identified in the service instances which may compromise privacy, security, efficiency, accuracy, performance, etc., of the service instances. In some examples, the vulnerabilities may be program bugs, loopholes in service and user authentication, gaps in protection against intrusion, exposure to distributed denial of service (DDoS) attacks, etc. The potential software vulnerabilities may or may not have a fix readily available. A software vulnerability database cloud consortium 306 may source vulnerability information from various repositories and standards, such as the National Vulnerability Database (NVD), Product Security Incident Response Team (PSIRT), etc., and supply this information on the external feed 307 to the service mesh 302. The software vulnerability ledger blockchain 308 may provide another external feed 309 to the service mesh 302 with vulnerabilities obtained from blockchain ledgers and other distributed ledgers, for example. Although not exhaustively shown and described, various other such external feeds may provide information to the service mesh 302 about any software vulnerabilities which have been identified in the industry, publicly known, or sourced from private entities.

In one or more examples, the control plane 310, or more specifically, the SVP 318 may interact with these external feeds 307, 309, etc., and gather software vulnerability and remediation information. In some examples, the SVP 318 may implement the following processes detecting vulnerabilities which may affect the service mesh 302. The SVP 318 may monitor the external feeds 307, 309 and consult the services catalog 320 to determine if any vulnerability is reported on the external feeds 307, 309 which may affect one or more services in the services catalog 320. Further, as and when any new services are added in the service mesh 302 or service discovery functions identify new services in the service mesh 302, the SVP 318 may update the services catalog 320 and monitor the external feeds 307, 309 to determine if any new or updated information added to the services catalog 320 may have vulnerabilities reported by the external feeds 307, 309.

Figure 4:
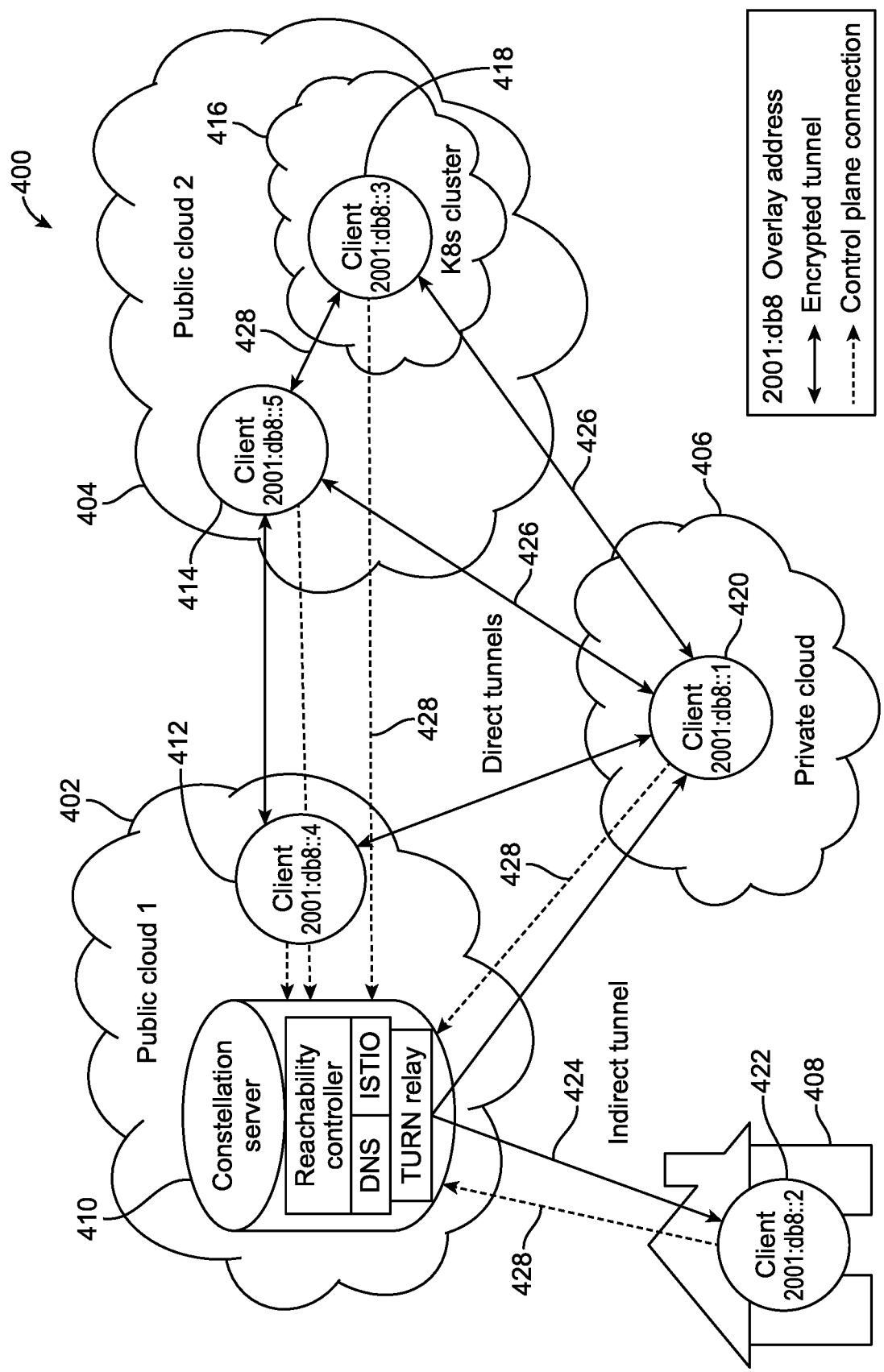
FIG. 4 illustrates an example network configuration with a constellation server and various agents/sidecar proxies each in connection with a client.

This disclosure has introduced some network configurations in FIGS. 1-3 which can be applicable to the following concepts. The disclosure next introduces the innovations focused on end-to-end security and connectivity between different microservices. FIG. 4 illustrates an example network configuration with a constellation server 410 and various agents or sidecar proxies, each deployed in connection with a client 412, 414, 418, 420, 422. To provide connectivity to microservice workloads in a heterogeneous environment, this disclosure focuses on a solution in which an agent or a sidecar proxy is deployed with, within or close to microservice workloads. A constellation server 410 is established that is reachable by all the agents 412, 414, 418, 420, 422. Agents can have different form factors depending on the microservice deployment type such as whether it is a container, virtual machine, or bare metal.

As shown in FIG. 4, a heterogeneous environment 400 includes a number of different components. A first public cloud 402 includes the constellation server 410 with a number of different modules or components. For example, a reachability controller can be introduced as part of the constellation server 410 and can include a domain name system (DNS) Component which can assign constellation IP addresses the various clients 412, 414, 418, 420, 422. An ISTIO component can be included which addresses the challenge that the developer's and operator's face as networks move from monolithic applications and transition towards a distributive microservice architecture as disclosed in FIG. 4. The word "ISTIO" is the Greek word for "sail" it is adopted as the name for an open platform-independent service mesh that provides traffic management, policy enforcement and telemetry collection. The ISTIO service mesh can provide services to the network of microservice applications and enable the interactions between them. The ISTIO component can provide insight and operational control over the service mesh as a whole and provide a complete solution to satisfy the various diverse requirements of microservice applications.

A traditional ISTIO service mesh can include multiple control plane topologies in which each cluster has an identical control plane installation and each control plane manages its own endpoints. In such a scenario, ISTIO gateways are provided with service entries so that one can configure a single logical service mesh that is composed from the participating clusters. The present solution introduces a different approach from previous ISTIO solutions but can also utilize or coordinate communication with the ISTIO service mesh.

A TURN relay can also be included within the constellation server 410 which can be used for providing indirect tunnels 424 between, for example, client 420 and client 422. TURN stands for "traversal using relays around NAT." The "NAT" is a network address translation method of remapping one IP address space into another by modifying the network address information in the IP header of packets while they are in transit across a routing device. If a host is located behind a NAT, then in certain situations, it can be impossible for that host to communicate directly with other hosts peers. In these situations, the host must use the services of an intermediate node that acts as a communication relay. The TURN protocol allows the host to control the operation of the relay and to exchange packets with its peers using the relay. TURN differs from some other relay control protocols in that it allows a client to communicate with multiple peers using a single relay address.

The TURN protocol was designed to be used as part of the ICE (Interactive Connectivity Establishment) approach to NAT traversal, though it also can be used without ICE. See IETF RFC 5766, 8155 and 8553, incorporated herein by reference, for more details around the TURN protocol. In some cases as described herein, an indirect tunnel 424 can be established between two peers 420, 422.

Client 412 is deployed within a public cloud 402. Client 414 is deployed within public cloud 404. Client 418 is configured within a K8s cluster 416. Client 420 is configured in a private cloud 406. Client 422 is configured in a home 408 or other building. Referenced in connection with each client 412, 414, 418, 420, 422 is a respective overlay address (2001:db8, for example) and encryption tunnels are shown as well as a control plane connection.

The server 410 serves as a public microservice discovery service. The server is in charge of microservice authentication, constellation IP address distribution and DNS for microservice discovery. Agents, or sidecar proxies, also maintain a control plane connection with the server 410 to help set up secure mesh tunnels with their peers. Agents that are deployed with, within or close to microservice workloads are in charge of registering themselves with the constellation server 410 in order to join the constellation application. The agents are also in charge of enforcing policies during tunnel set up.

As introduced above, the server 410 includes a number of components and performs a number of functions. The server 410 performs agent registration authentication. The service is responsible for verifying agent identity and delivering signed certificates. The services also in charge of distributing access policies to the agents. In one example, the ISTIO is an example approach or candidate for practical implementation of this kind of service.

The DNS service associated with the server 410 enables microservice discovery. In one aspect, it can be considered a regular DNS server but operates only for a set of constellation application and specific domains. The reachability controller component shown in server 410 is responsible for maintaining a database of agent reachability information candidates, distributed constellation IP addresses the agents and synchronizing connectivity set of processes.

Figure 5A:
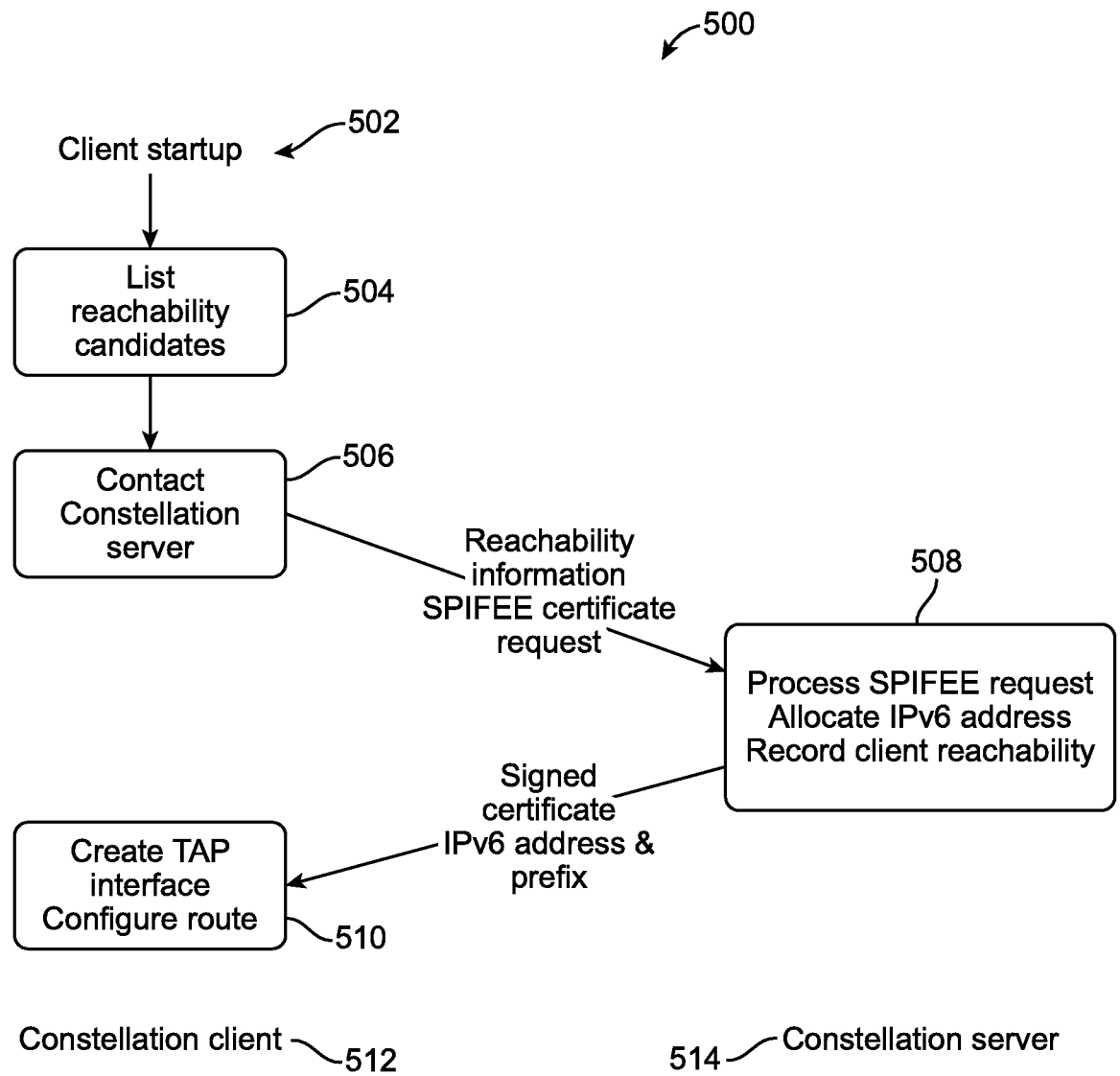
FIG. 5A illustrates the setup connectivity process.

FIG. 5A illustrates a method example related to the start up in registration process. The first client starts up (502). As noted above, the client 512 consists of one or more of a microservice workload and its associated agent or sidecar proxy. The steps that are described herein can be performed by any of these components that make up the client. After the client starts up, it or its agent gathers reachability candidate information (504) and contacts the constellation server (506). The reachability information can include public and private IPv4 addresses, public and private IPv6 addresses, the gateways IPv6 address (which can be gathered using UPNP, STU, or Cloud API) as well as any endpoint related information required by the ICE protocol defined in IETF RFC 8445. The client issues a reachability information SPIFEE certificate request (506) to the constellation server (514). Step (506) can involve agent contacting the server 410/514 for authentication. The authentication can be performed according to SPIFEE specifications. The SPIFEE specifications refer to the secure production identity framework for everyone. The specifications define a framework in some standards for identifying and securing to communications between web-based services. Authentication can be performed by other protocols as well and this disclosure is not limited to the particular SPIFEE standard.

The respective agent sends its SPIFEE Verifiable identity document (SVID) to the server 410/514. If the authentication succeeds, the agent 512 receives a valid certificate that will be used later for authentication with other peer microservices. The constellation server processes the SPIFEE request and allocates an IPv6 address and records the respective client reachability (508). Once authenticated, the server 410 distributes to the agent a constellation address for the respective microservice (508). The IPv6 address will be used for any microservice to micro service communications.

The constellation server 514 than transmits a signed certificate, the IPv6 address and the prefix to the constellation client 512. The constellation client then creates a TAP interface and can figures routing data for communication between different clients (510). A TAP interface is a software-only interface in that it only exists in the kernel and has no physical hardware component.

One can think of a TAP interface (or a TUN interface) as a regular network interface that, when the kernel decides that the moment has come to send data "on the wire", instead sends data to some userspace program that is attached to the interface using a specific procedure. When the program attaches to the TAP interface, it gets a special file descriptor, reading from which gives it the data that the interface is sending out. In a similar fashion, the program can write to this special descriptor, and the data (which must be properly formatted) will appear as input to the TAP interface. To the kernel, it would look like the TAP interface is receiving data "from the wire".

The difference between a TAP interface and a TUN interface is that a TAP interface outputs (and must be given) full ethernet frames, while a TUN interface outputs (and must be given) raw IP packets (and no ethernet headers are added by the kernel). Whether an interface functions like a TUN interface or like a TAP interface is specified with a flag when the interface is created. The principles disclosed herein would apply to either type of interface.

The TAP/TUN interface can be transient, meaning that it's created, used and destroyed by the same program. When the program terminates, even if it doesn't explicitly destroy the interface, the interfaces ceases to exist. Another option is to make the interface persistent. In this case the interface can be created using a dedicated utility (like tuncti or openvpn--mktun), and then normal programs can attach to it. When programs attach, they must connect using the same type (TUN or TAP) used to originally create the interface, otherwise they will not be able to attach.

Once a TUN/TAP interface is in place, it can be used just like any other interface, meaning that IP addresses can be assigned, its traffic can be analyzed, firewall rules can be created, routes pointing to it can be established, etc.

Code to create a brand new interface and to (re)attach to a persistent interface is essentially the same. The difference is that the former must be run by root (by a user with the CAP_NET_ADMIN capability), while the latter can be run by an ordinary user if certain conditions are met. Next is discussed the creation of a new interface.

First, the device/dev/net/tun must be opened read/write. That device is also called the clone device, because it's used as a starting point for the creation of any TUN/TAP virtual interface. The operation (as with any open( ) call) returns a file descriptor. But that's not enough to start using it to communicate with the interface.

The next step in creating the interface is issuing a special ioctl( ) system call, whose arguments are the descriptor obtained in the previous step, the TUNSETIFF constant, and a pointer to a data structure containing the parameters describing the virtual interface (basically, its name and the desired operating mode—TUN or TAP). As a variation, the name of the virtual interface can be left unspecified, in which case the kernel will pick a name by trying to allocate the "next" device of that kind (for example, if tap2 already exists, the kernel will try to allocate tap3, and so on). All of this must be done by root (or by a user with the CAP_NET_ADMIN capability). If the ioctl( )succeeds, the virtual interface is created and the file descriptor previously had is now associated to it, and can be used to communicate.

At this point, two things can happen. The program can start using the interface right away (probably configuring it with at least an IP address before), and, when it's done, terminate and destroy the interface. The other option is to issue other special ioctl( ) calls to make the interface persistent, and terminate leaving it in place for other programs to attach to it. This is what programs like tuncti or openvpn--mktun do, for example. These programs usually can also optionally set the ownership of the virtual interface to a non-root user and/or group, so programs running as non-root but with the appropriate privileges can attach to the interface later. The basic code used to create a virtual interface is shown in the file Documentation/networking/tuntap.txt in the kernel source tree. This documentation is incorporated herein by reference.

Figure 5B:
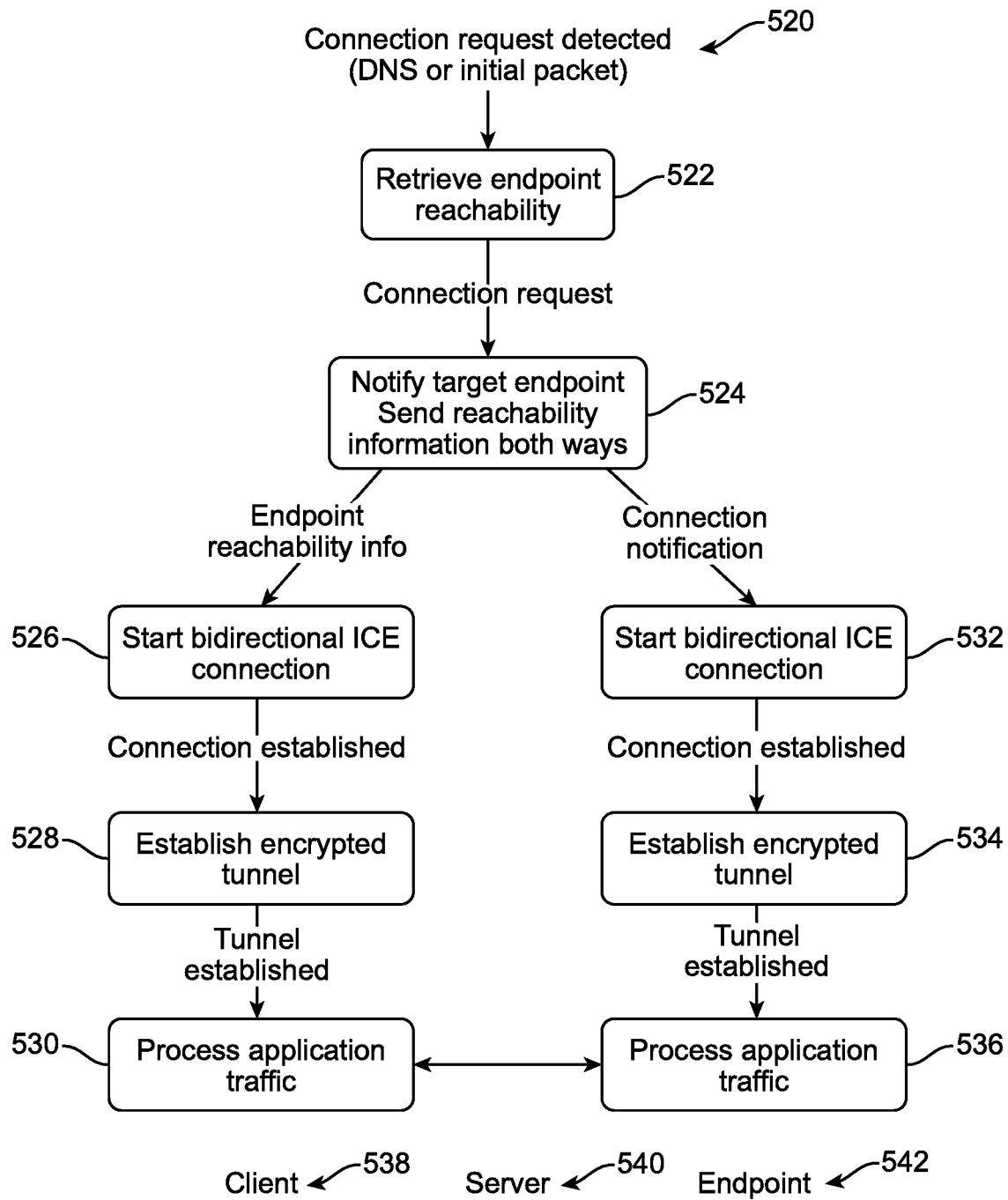
FIG. 5B illustrates various connectivity options during deployment.

FIG. 5B illustrates setting up the connectivity between peer clients. The agent or sidecar proxy will typically perform this operation. In FIG. 5B, some steps are performed by a client 538, some are performed by the server 540 and some are performed by another client or endpoint 542. The process starts with the detection of a connection request such as request associated with DNS or an initial packet (520). The client 538 then has to retrieve the endpoint reachability data 522. A connection request is sent from the client 538 to the server 540. The server 540 notifies the target endpoint and sends reachability information (524) both to the client 538 and to the endpoint 542. The following steps that occur on the client 538. Upon receiving the endpoint reachability information, the client starts the bidirectional ICE connection process (526). Upon a connection being established, the client 538 establishes an encrypted tunnel (528) with the endpoint and once the tunnel is established, the client 538 can process application traffic that can flow (530) between the client 538 and the endpoint 542. The tunnel can be direct or indirect as described herein.

The processing at the endpoint 542 includes, after receiving a connection notification, starting the bidirectional ICE connection with the client 538 (532). Once the connection is established, the endpoint 542 participates in establishing the encrypted tunnel (534) with the client 538. Once the tunnel is established, the endpoint 542 can process application traffic (536) between the endpoint 542 and the client 538.

Different protocols could be used to set up the connectivity between the peers. When it is required, the ICE protocol is used and FIG. 5C illustrates or summarizes the different connectivity of options between different peers. In table 550, the connectivity options for one endpoint can be shown in columns 552 and the connectivity options for another and point can be shown in the rows 554. The various options include, for example, Global IPv6 with no firewall, global IPv6 with ingress blocked, global IPv4 with no firewall, global IPv4 with ingress blocked, private IPv4 that is pierceable NAT (UPNP, STUN), and private IPv4, unpierceable NAT. These represent an example of the connectivity options and other options are also contemplated as well. The table shows an example of how the type of tunneling that will or can occur between respective endpoints can be determined based on the respective connectivity characteristics. The characteristics can either be trivial and thus the tunneling can be direct (See feature 426 in FIG. 4) or the characteristics might require a relay 556.

FIG. 4 shows an indirect tunnel 424 which uses the TURN relay as part of the consolation server 410. When establishing the connectivity between individual endpoints, the table shown in FIG. 5C can be accessed for determining whether each individual tunnel between two respective endpoints should be direct or indirect. For example, feature 556 represents an indirect tunnel where a relay is required when one endpoint has a connectivity profile of private IPv4, unpierceable NAT and the other endpoint has a connectivity profile of global IPv6 with no firewall. In the example shown, the relay is IP4 to IP6, using Teredo, which is a transition technology that gives full IPv6 connectivity for IPv6-capable clients that are on the IPv4 Internet but have no native connectivity to an IPv6 network. Teredo routes datagrams on the IPv4 Internet and through NAT devices. Other translation services can include MAP-T, UPNP+Map-T or others. UPNP stands for "Universal Plug and Play" which is a set of network protocols the permits network devices, such as personal computers, printers, Internet gateways, WiFi access points, etc. to discover each other's presence on the network and establish functional network services for datasharing. The Map-T protocol is the Mapping of Address and Port Using Translation which provides for connectivity to IPv4 hosts across IPv6 domains. Each client 422, 412, 414, 416, 420 can have its own control plane connection 428 to the server 410.

The "*" in location 558 of FIG. 5C indicates that the process should open a port on the firewall that allows it and have the other node connect to it. The "" symbol in location 560** indicates that the connection should open a port in the NAT that allows it and have the other node connect to it.

Once a connection is been established between two agents, an encrypted tunnel is set up and the peers authorized using a certificate. Respective agents can authorize or decline connectivity with another microservice based on the application or a local policy. Application IPv6 addresses delivered by the server 410 are assigned to both ends of the tunnel. The local agent can enforce fine-grained group security policies as well as more advanced policies based on the identity of the remote party advertised in the X.509 remote certificate. As noted above, the agent will have to run with CAP_NET_ADMIN capability to be able to create the TAP interface as described above and to assign the constellation IP addresses.

Following the processes described herein, the system can provide end-to-end secured connectivity and global reachability between microservices running as service functions, inside containers, inside virtual machines, or even on bare metal. The approach would be compatible with all existing cloud technologies such as, but not limited to, Kubernetes, OpenStack, VMs and bare-metal servers. It can work both in public and private clouds.

Figure 5D:
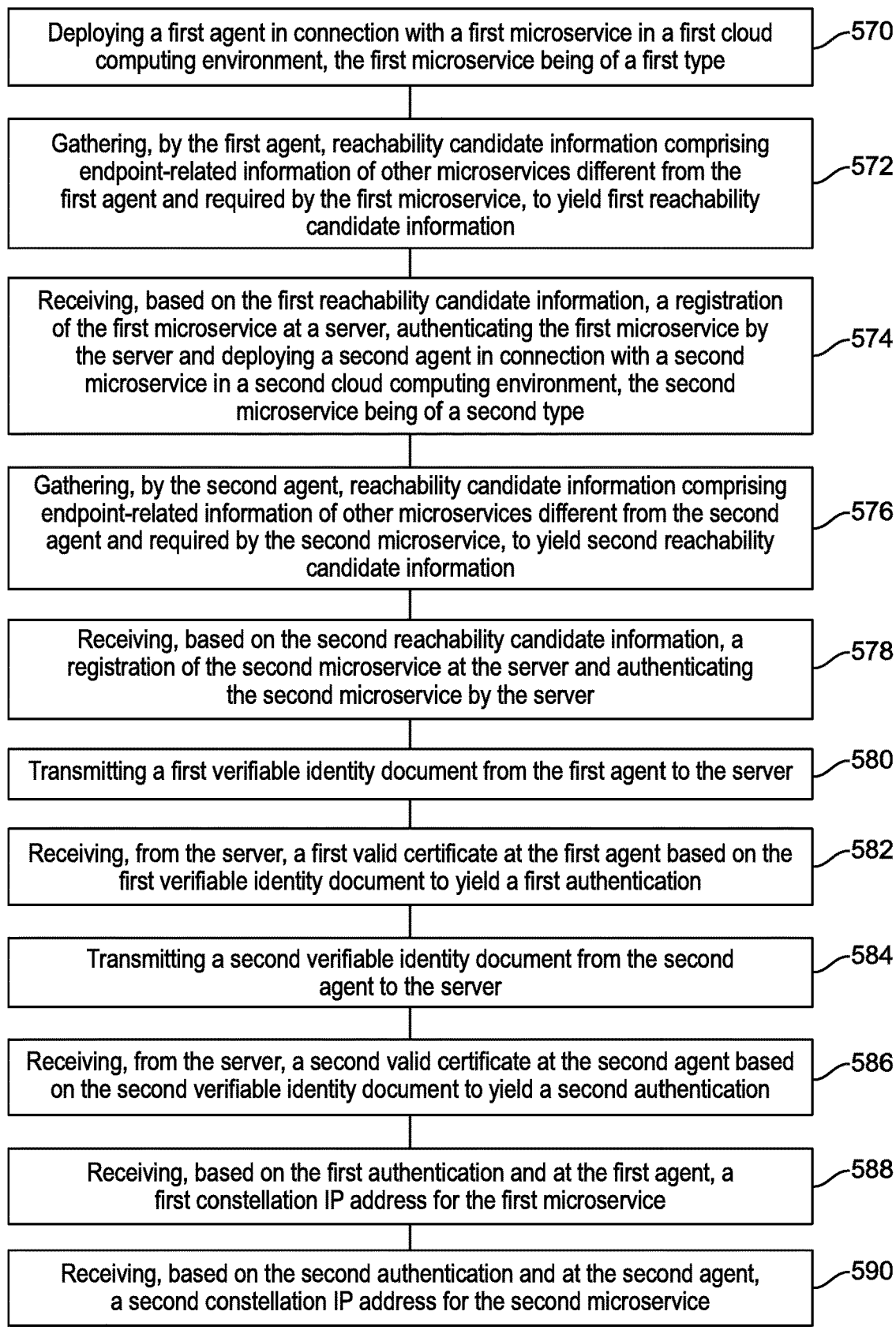
FIG. 5D illustrates a method example detailing the registration process for agents or sidecar proxies.

FIG. 5D illustrates a method example which covers the initial registration and setup process for the constellation of clients to be able to establish, on demand, direct or indirect tunnels between respective microservices, even if they are different types. An example method includes deploying a first agent in connection with a first microservice in a first cloud computing environment, the first microservice being of a first type (570), gathering, by the first agent, reachability candidate information including endpoint-related information of other microservices different from the first agent and required by the first microservice, to yield first reachability candidate information (572), receiving, based on the first reachability candidate information, a registration of the first microservice at a server, authenticating the first microservice by the server and deploying a second agent in connection with a second microservice in a second cloud computing environment, the second microservice being of a second type (574). In one aspect, the first cloud computing environment differs from the second cloud computing environment. The environments could be of the same type as well or share a number of characteristics.

The method further includes gathering, by the second agent, reachability candidate information including endpoint-related information of other microservices different from the second agent and required by the second microservice, to yield second reachability candidate information (576), receiving, based on the second reachability candidate information, a registration of the second microservice at the server and authenticating the second microservice by the server (578). The method can further include transmitting a first verifiable identity document from the first agent to the server (580), receiving, from the server, a first valid certificate at the first agent based on the first verifiable identity document to yield a first authentication (582), transmitting a second verifiable identity document from the second agent to the server (584) and receiving, from the server, a second valid certificate at the second agent based on the second verifiable identity document to yield a second authentication (586).

Additional steps can include receiving, based on the first authentication and at the first agent, a first constellation IP address for the first microservice (588), and receiving, based on the second authentication and at the second agent, a second constellation IP address for the second microservice (590). The server enables microservice discovery and distributes constellation IP addresses to authorized agents such that end-to-end secured connectivity and global reachability is available between the first microservice of the first type and the second microservice of the second type.

In one aspect, the first type differs from the second type. For example, the first type and the second type each can include one of a container, a virtual machine, a serverless type, or a bare-metal type. The first type could be a virtual machine and the second type could be a bare-metal type.

In another example, the method can further include establishing, based on the first authentication and the second authentication, either a direct tunnel or an indirect tunnel between the first microservice and the second micro service. The step of determining whether to establish the direct tunnel or the indirect tunnel can be based on referencing a table or database of respective connectivity options as shown in FIG. 5C and which can include a first connectivity option for the first microservice and a second activity option for the second microservice.

When the table 550 indicates that the first microservice utilizes an IPv4 protocol and the second microservice utilizes an IPv6 protocol, then the establishing further can include establishing an indirect tunnel between the first microservice and the second microservice. This is a result of applying the table shown in FIG. 5C. When the table indicates that the first microservice utilizes an IPv4 protocol and is unpierceable NAT and the second microservice utilizes an IPv4 protocol and is unpierceable NAT, then the establishing further can include establishing an indirect tunnel between the first microservice and the second microservice using a TURN relay 562. The various selections shown in FIG. 5C can change as well. The specific assignments of when to relate a communication or when to make it direct are exemplary and any selection can be assigned to any combination of endpoint characteristics.

A server or system for enabling end-to-end secured connectivity and global reachability in a constellation of microservices can include at least one processor and a computer readable storage device. The storage device can store instructions which, when excused by the at least one processor, cause the at least one processor to perform operations to result in a special purpose computer programmed according to the algorithm or steps disclosed herein. The instructions can include one or more of receiving reachability information and a SPIFEE certificate request from a first client in a constellation of microservices, processing the SPIFEE certificate request to generate a first signed certificate, allocating a first IPv6 address to the first client, recording first client reachability in a database, transmitting the first signed certificate and the first IPv6 address to the first client and, upon a connection request by the first client to connect to a second client, notifying the second client of the connection request, sending reachability information to the first client and to the second client to enable a direct tunnel or an indirect tunnel to be established between the first client and the second client for enabling application traffic to flow between the first client and the second client. Any algorithm or series of steps disclosed herein, when implemented on a computer system, cause or result in that computer system being a special purpose computer.

In another aspect, the computer readable storage device an store additional instructions which, when excused by the at least one processor, cause the at least one processor to perform operations further including one or more of receiving reachability information and a second SPIFEE certificate request from the second client in the constellation of microservices, processing the second SPIFEE certificate request to generate a second signed certificate, allocating a second IPv6 address to the second client, recording second client reachability in the database and transmitting the second signed certificate and the second IPv6 address to the second client, to enable the application traffic to flow between the first client and the second client through the direct tunnel or the indirect tunnel.

The constellation of microservices can include the first client being of a first type and the second client being of a second type. The first client can include a first microservice and a first agent configured with, within or close to the first microservice and wherein the second client can include a second microservice and a second agent configured with, within or close to the second microservice. The first type and the second type can in one aspect be the same type of client but it is anticipated that they will be of different types.

Figure 5E:
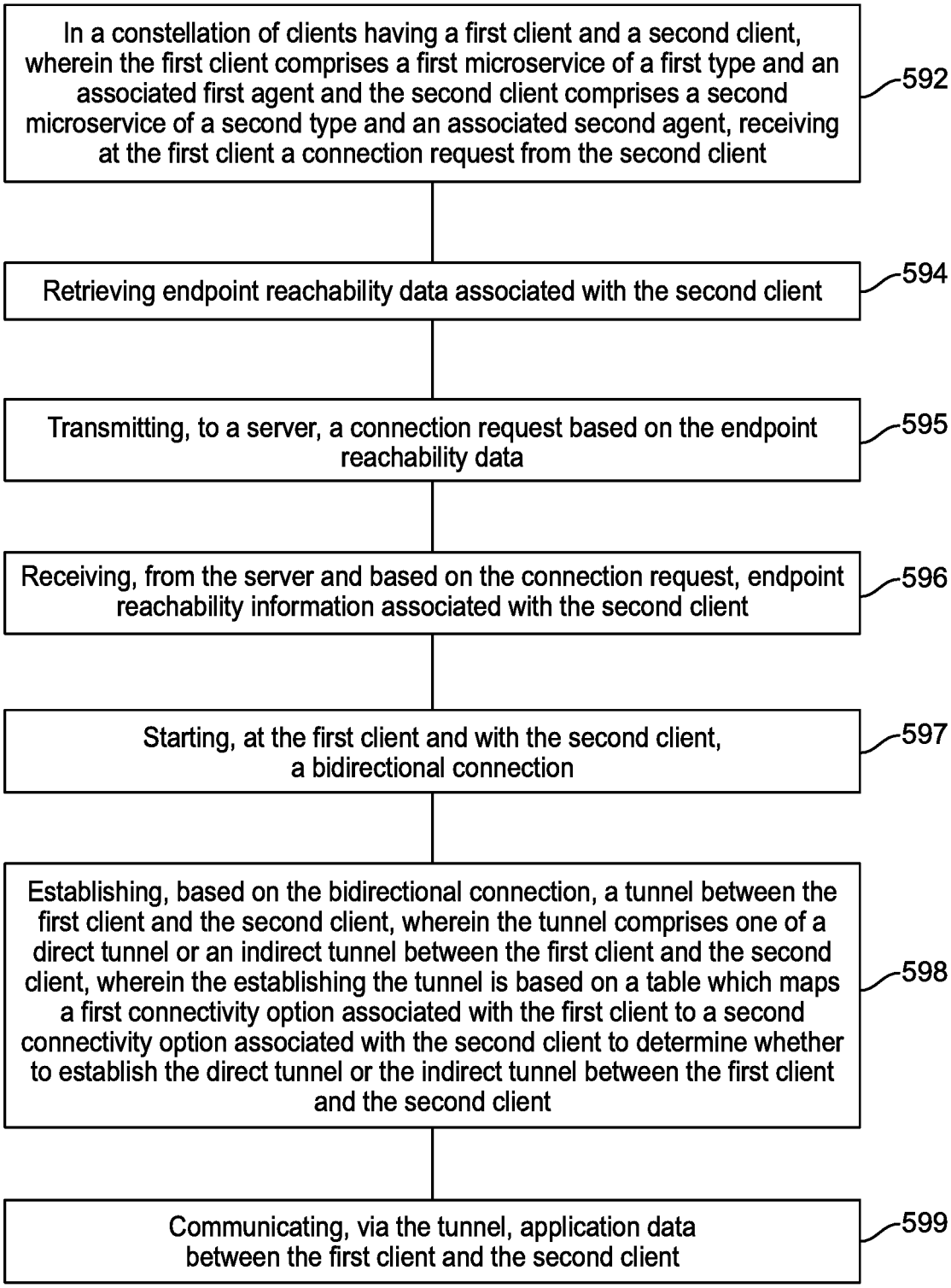
FIG. 5E illustrates another method example focused on the connection process following the initial registration and deployment.

FIG. 5E illustrates another example method from the standpoint of the clients and processes performed by each client in a constellation of clients. A method includes, in a constellation of clients having a first client and a second client, wherein the first client includes a first microservice of a first type and an associated first agent and the second client includes a second microservice of a second type and an associated second agent, receiving at the first client a connection request from the second client (592), retrieving endpoint reachability data associated with the second client (594) and transmitting, to a server, a connection request based on the endpoint reachability data (595).

The method further includes receiving, from the server and based on the connection request, endpoint reachability information associated with the second client (596), starting, at the first client and with the second client, a bidirectional connection (597), and establishing, based on the bidirectional connection, a tunnel between the first client and the second client (598). The tunnel can include one of a direct tunnel or an indirect tunnel between the first client and the second client. The establishing of the tunnel can further be based on a table similar to the table shown in FIG. 5C which maps a first connectivity option associated with the first client to a second connectivity option associated with the second client to determine whether to establish the direct tunnel or the indirect tunnel between the first client and the second client. The method can include communicating, via the tunnel, application data between the first client and the second client (599).

The first connectivity option and the second connectivity option each can include one of a global IPv6 with no firewall, a global IPv6 with ingress blocked, a global IPv4 with no firewall, a global IPv4 with ingress blocked, a private IPv4 with pierceable NAT and private IPv4 with unpierceable NAT. When the table, an example of which is shown in FIG. 5C, indicates that the first microservice utilizes an IPv4 protocol and the second microservice utilizes an IPv6 protocol, then the establishing of the tunnel further includes establishing an indirect tunnel between the first microservice and the second microservice. In another example, when the table indicates that the first microservice utilizes an IPv4 protocol and is unpierceable NAT and the second microservice utilizes an IPv4 protocol and is unpierceable NAT, then the establishing of the tunnel further includes establishing an indirect tunnel between the first microservice and the second microservice using a TURN relay. The server assigns a first constellation IP address to the first client and a second constellation IP address to the second client. In another aspect, the associated first agent and the associated second agent each enforce policies during the establishing of the tunnel. Policies can relate to security, efficiency, user identity, microservice identity, energy use, geographic policies, and so forth.

Figure 6:
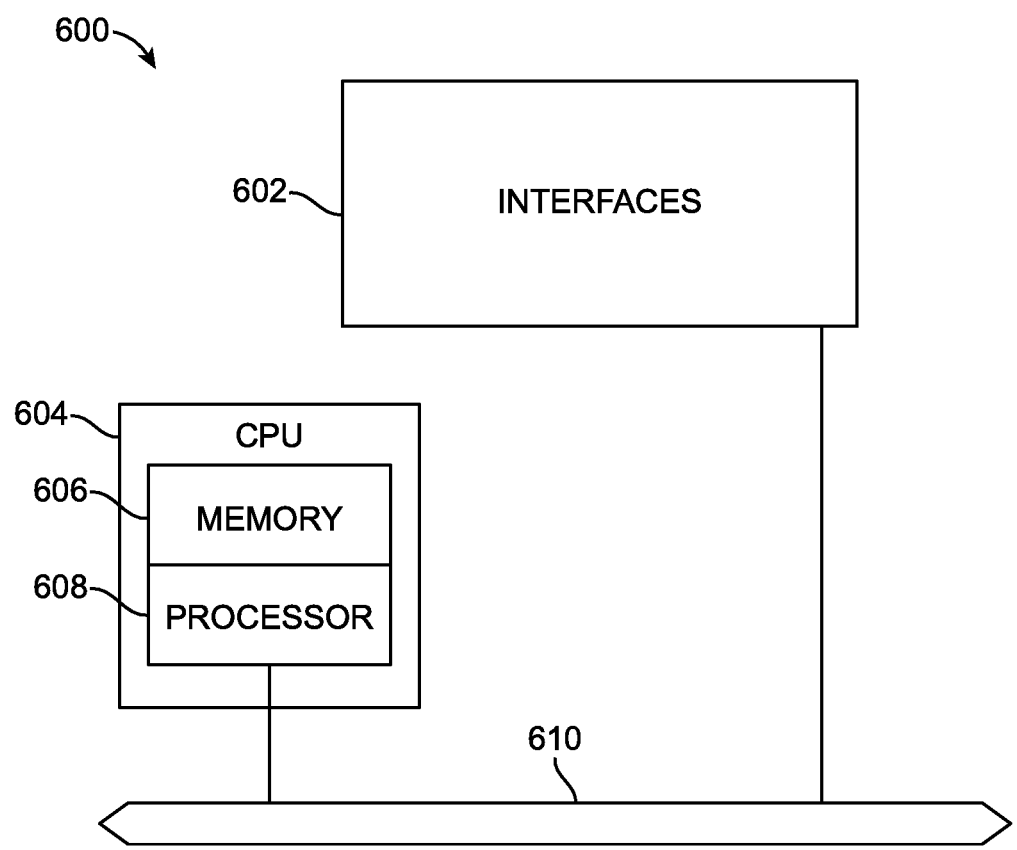
FIG. 6 illustrates an example network device in accordance with various examples.

FIG. 6 illustrates an example network device 600 suitable for implementing aspects of this disclosure. In some examples, the control plane 310 and/or the SVP 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. For example, claims could be drafted from the standpoint of one client, an agent or a sidecar proxy, the server 410, a transmitting client or receiving client, and so forth. All data communications which might be transmissions, receiving data, establishing tunnels, and so forth can be defined from the standpoint of any of these nodes or components within the overall network. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
deploying a first agent in connection with a first microservice in a first cloud computing environment, the first microservice being of a first type;
gathering, by the first agent, reachability candidate information comprising endpoint-related information of other microservices different from the first agent and required by the first microservice, to yield first reachability candidate information;
receiving, based on the first reachability candidate information, a registration of the first microservice at a server and authenticating the first microservice by the server;
deploying a second agent in connection with a second microservice in a second cloud computing environment, the second microservice being of a second type, wherein the first cloud computing environment differs from the second cloud computing environment;
gathering, by the second agent, reachability candidate information comprising endpoint-related information of other microservices different from the second agent and required by the second microservice, to yield second reachability candidate information;
receiving, based on the second reachability candidate information, a registration of the second microservice at the server and authenticating the second microservice by the server;
transmitting a first verifiable identity document from the first agent to the server;
receiving, from the server, a first valid certificate at the first agent based on the first verifiable identity document to yield a first authentication;
transmitting a second verifiable identity document from the second agent to the server;
receiving, from the server, a second valid certificate at the second agent based on the second verifiable identity document to yield a second authentication;
receiving, based on the first authentication and at the first agent, a first constellation IP address for the first microservice; and
receiving, based on the second authentication and at the second agent, a second constellation IP address for the second microservice, where the server enables microservice discovery and distributes constellation IP addresses to authorized agents such that end-to-end secured connectivity and global reachability is available between the first microservice of the first type and the second microservice of the second type.

2. The method of claim 1, wherein the first type differs from the second type.

3. The method of claim 2, wherein the first type and the second type each comprise one of a container, a virtual machine, a serverless type, or a bare-metal type.

4. The method of claim 1, further comprising:
establishing, based on the first authentication and the second authentication, either a direct tunnel or an indirect tunnel between the first microservice and the second microservice.

5. The method of claim 4, wherein determining whether to establish the direct tunnel or the indirect tunnel is based on referencing a table of respective connectivity options and which includes a first connectivity option for the first microservice and a second activity option for the second microservice.

6. The method of claim 5, wherein when the table of respective connectivity options indicates that the first microservice utilizes an IPv4 protocol and the second microservice utilizes an IPv6 protocol, then the establishing further comprises establishing an indirect tunnel between the first microservice and the second microservice.

7. The method of claim 5, wherein when the table of respective connectivity options indicates that the first microservice utilizes an IPv4 protocol and is unpierceable NAT and the second microservice utilizes an IPv4 protocol and is unpierceable NAT, then the establishing further comprises establishing an indirect tunnel between the first microservice and the second microservice using a TURN relay.

8. A server for enabling end-to-end secured connectivity and global reachability in a constellation of microservices, the server comprising:
at least one processor; and
a computer readable storage device storing instructions which, when excused by the at least one processor, cause the at least one processor to perform operations comprising:
deploying a first agent in connection with a first microservice in a first cloud computing environment, the first microservice being of a first type;
gathering, by the first agent, reachability candidate information comprising endpoint-related information of other microservices different from the first agent and required by the first microservice, to yield first reachability candidate information;
receiving, based on the first reachability candidate information, a registration of the first microservice and authenticating the first microservice;
deploying a second agent in connection with a second microservice in a second cloud computing environment, the second microservice being of a second type, wherein the first cloud computing environment differs from the second cloud computing environment;
gathering, by the second agent, reachability candidate information comprising endpoint-related information of other microservices different from the second agent and required by the second microservice, to yield second reachability candidate information;

receiving, based on the second reachability candidate information, a registration of the second microservice and authenticating the second microservice;
receiving a first verifiable identity document from the first agent;
transmitting, from the server, a first valid certificate at the first agent based on the first verifiable identity document to yield a first authentication;
receiving a second verifiable identity document from the second agent;
transmitting, from the server, a second valid certificate at the second agent based on the second verifiable identity document to yield a second authentication;
receiving, based on the first authentication and at the first agent, a first constellation IP address for the first microservice; and
receiving, based on the second authentication and at the second agent, a second constellation IP address for the second microservice, where the server enables microservice discovery and distributes constellation IP addresses to authorized agents such that end-to-end secured connectivity and global reachability is available between the first microservice of the first type and the second microservice of the second type.

9. The server of claim 8, wherein the first type differs from the second type.

10. The server of claim 9, wherein the first type and the second type each comprise one of a container, a virtual machine, a serverless type, or a bare-metal type.

11. The server of claim 8, wherein the computer readable storage device stores additional instructions which, when excused by the at least one processor, cause the at least one processor to perform operations further comprising:
establishing, based on the first authentication and the second authentication, either a direct tunnel or an indirect tunnel between the first microservice and the second microservice.

12. The server of claim 11, wherein determining whether to establish the direct tunnel or the indirect tunnel is based on referencing a table of respective connectivity options and which includes a first connectivity option for the first microservice and a second activity option for the second microservice.

13. The server of claim 12, wherein when the table of respective connectivity options indicates that the first microservice utilizes an IPv4 protocol and the second microservice utilizes an IPv6 protocol, then the establishing further comprises establishing an indirect tunnel between the first microservice and the second microservice.

14. The server of claim 12, wherein when the table of respective connectivity options indicates that the first microservice utilizes an IPv4 protocol and is unpierceable NAT and the second microservice utilizes an IPv4 protocol and is unpierceable NAT, then the establishing further comprises establishing an indirect tunnel between the first microservice and the second microservice using a TURN relay.

15. A set of cloud computing environments comprising:
a first cloud computing environment comprising:
at least one first processor; and
a first computer readable storage device storing instructions which, when excused by the at least one first processor, cause the at least one first processor to perform operations comprising:
deploying a first agent in connection with a first microservice in the first cloud computing environment, the first microservice being of a first type;
gathering, by the first agent, reachability candidate information comprising endpoint-related information of other microservices different from the first agent and required by the first microservice, to yield first reachability candidate information;
registering, based on the first reachability candidate information, the first microservice at a server, wherein the server authenticates the first microservice;
transmitting a first verifiable identity document from the first agent to the server;
receiving, from the server, a first valid certificate at the first agent based on the first verifiable identity document to yield a first authentication; and
receiving, based on the first authentication and at the first agent, a first constellation IP address for the first microservice; and
a second cloud computing environment comprising:
at least one second processor; and
a second computer readable storage device storing instructions which, when excused by the at least one second processor, cause the at least one second processor to perform operations comprising:
deploying a second agent in connection with a second microservice in the second cloud computing environment, the second microservice being of a second type, wherein the first cloud computing environment differs from the second cloud computing environment;
gathering, by the second agent, reachability candidate information comprising endpoint-related information of other microservices different from the second agent and required by the second microservice, to yield second reachability candidate information;
registering, based on the second reachability candidate information, the second microservice at the server, wherein the server authenticates the second microservice;
transmitting a second verifiable identity document from the second agent to the server;
receiving, from the server, a second valid certificate at the second agent based on the second verifiable identity document to yield a second authentication; and
receiving, based on the second authentication and at the second agent, a second constellation IP address for the second microservice, wherein the server enables microservice discovery and distributes constellation IP addresses to authorized agents such that end-to-end secured connectivity and global reachability is available between the first microservice of the first type and the second microservice of the second type.

16. The set of cloud computing environments of claim 15, wherein the first type differs from the second type.

17. The set of cloud computing environments of claim 16, wherein the first type and the second type each comprise one of a container, a virtual machine, a serverless type, or a bare-metal type.

18. The set of cloud computing environments of claim 15, wherein the server establishes, based on the first authentication and the second authentication, either a direct tunnel or an indirect tunnel between the first microservice and the second microservice.

19. The set of cloud computing environments of claim 18, wherein determining whether to establish the direct tunnel or the indirect tunnel is based on referencing a table of respective connectivity options and which includes a first connectivity option for the first microservice and a second activity option for the second microservice.

20. The set of cloud computing environments of claim 19, wherein when the table of respective connectivity options indicates that the first microservice utilizes an IPv4 protocol and the second microservice utilizes an IPv6 protocol, then the establishing further comprises establishing an indirect tunnel between the first microservice and the second microservice.

21. The set of cloud computing environments of claim 19, wherein when the table of respective connectivity options indicates that the first microservice utilizes an IPv4 protocol and is unpierceable NAT and the second microservice utilizes an IPv4 protocol and is unpierceable NAT, then the establishing further comprises establishing an indirect tunnel between the first microservice and the second microservice using a TURN relay.

* * * * *